US008059710B2

United States Patent
Abou Rjeily

(10) Patent No.: US 8,059,710 B2
(45) Date of Patent: Nov. 15, 2011

(54) SPACE-TIME CODING METHOD FOR A MULTI-ANTENNA SYSTEM OF THE UWB PULSE TYPE

(75) Inventor: Chadi Abou Rjeily, Zahle (LB)

(73) Assignee: Commissariat a l'Energie Atomique, Paris (FR)

( * ) Notice: Subject to any disclaimer, the term of this patent is extended or adjusted under 35 U.S.C. 154(b) by 414 days.

(21) Appl. No.: 12/444,016

(22) PCT Filed: Oct. 1, 2007

(86) PCT No.: PCT/FR2007/052052
§ 371 (c)(1),
(2), (4) Date: Apr. 2, 2009

(87) PCT Pub. No.: WO2008/040906
PCT Pub. Date: Apr. 10, 2008

(65) Prior Publication Data
US 2010/0008404 A1    Jan. 14, 2010

(30) Foreign Application Priority Data

Oct. 3, 2006    (FR) .................................... 06 54064

(51) Int. Cl.
*H03K 7/04*    (2006.01)
*H03K 7/06*    (2006.01)
*H03K 9/04*    (2006.01)
*H03K 9/06*    (2006.01)

(52) U.S. Cl. ......... 375/239; 375/131; 375/138; 375/353

(58) Field of Classification Search .................. 375/130, 375/131, 138, 239, 256, 259–260, 353
See application file for complete search history.

(56) References Cited

U.S. PATENT DOCUMENTS

| 7,769,072 B2 * | 8/2010 | Abou Rjeily et al. .......... 375/130 |
| 7,817,715 B2 * | 10/2010 | Abou Rjeily .................. 375/239 |
| 7,864,831 B2 * | 1/2011 | Abou Rjeily ................. 375/130 |
| 7,903,752 B2 * | 3/2011 | Abou Rjeily ................. 375/262 |
| 7,933,307 B2 * | 4/2011 | Rjeily et al. .................. 375/130 |

(Continued)

FOREIGN PATENT DOCUMENTS

EP    1 681 819    7/2006

OTHER PUBLICATIONS

Abou-Rjeily et al., "On High Data Rate Space-Time Codes for Ultra-Wideband Systems," IEEE conference on Ultra-Wideband, Sep. 2005.*

(Continued)

*Primary Examiner* — David C. Payne
*Assistant Examiner* — James M Perez
(74) *Attorney, Agent, or Firm* — Oblon, Spivak, McClelland, Maier & Neustadt, L.L.P.

(57) ABSTRACT

A space-time coding method for a UWB transmission system comprising at least two radiated elements. The method codes a block of information symbols $S=(a_1, a_2 \ldots, a_p,)$ belonging to an M-PPM modulation or M-PPM-M'-PAM composite modulating alphabet with M being even, into a sequence of vectors $(s^{i,j}, \Omega s^{i,j})$, the components of a vector being intended to modulate a UWB pulse signal for a radiative element of said system and for a given transmission interval $(T_f)$.

8 Claims, 4 Drawing Sheets

U.S. PATENT DOCUMENTS

| | | | |
|---|---|---|---|
| 7,974,361 B2* | 7/2011 | Abou Rjeily | 375/267 |
| 2006/0039489 A1* | 2/2006 | Ikram et al. | 375/260 |
| 2006/0182166 A1 | 8/2006 | Abou-Rjeily et al. | |
| 2007/0237209 A1 | 10/2007 | Abou-Rjeily | |
| 2008/0043873 A1* | 2/2008 | Ariyavisitakul | 375/267 |
| 2008/0212720 A1 | 9/2008 | Abou-Rjeily | |
| 2008/0232455 A1 | 9/2008 | Abou-Rjeily | |
| 2009/0103589 A1 | 4/2009 | Abou-Rjeily | |
| 2010/0008404 A1 | 1/2010 | Abou Rjeily | |

OTHER PUBLICATIONS

Abou-Rjeily et al., "Distributed Algebraic Space Time Codes for Ultra Wideband Communications", DRAFT, Oct. 25, 2005, pp. 1-17.*

U.S. Appl. No. 12/863,990, filed Jul. 29, 2010, Abou Rjeily.

Abou-Rjeily, C. et al., "Space-Time Coding for Multiuser Ultra-Wideband Communications", Internet Citation, URL:http://www.comelec.enst.fr/{belfiore/UWB_MIMO.pdf> (Sep. 13, 2005) Total pages 25, XP-008071459.

Baccarelli, E. et al., "A Simple Multi-Antenna Transceiver for Ultra Wide Band Based 4GWLANs", Wireless Communications and Networking Conference, IEEE Communications Society, vol. 3, pp. 1782-1787 (Mar. 21, 2004) XP-010708212.

Tyagi, A. et al., "M-PAM Space Time Trellis Codes for Multi-Antenna Ultra-Wideband Communications", Personal Wireless Communications, ICPWC, pp. 308-311 (Jan. 23, 2005) XP-010798569.

Heliot, F. et al., "Performance of Space-Time Block Coding and Space-Time Trellis Coding for Impulse Radio", IEEE Communications Society, GLOBECOM, pp. 3225-3229 (Nov. 29, 2004) XP-010758316.

U.S. Appl. No. 12/293,666, filed Sep. 19, 2008, Abou Rjeily.
U.S. Appl. No. 12/443,919, filed Apr. 1, 2009, Abou Rjeily.
U.S. Appl. No. 12/518,672, filed Jun. 11, 2009, Abou Rjeily.

* cited by examiner

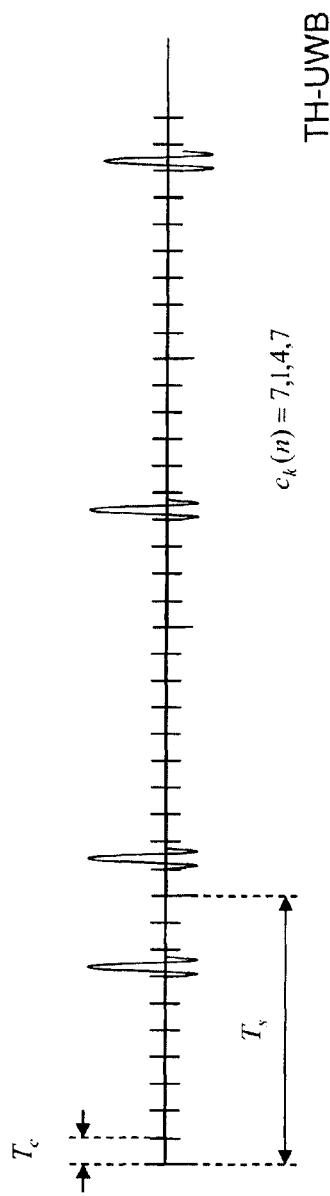
FIG. 2A TH-UWB
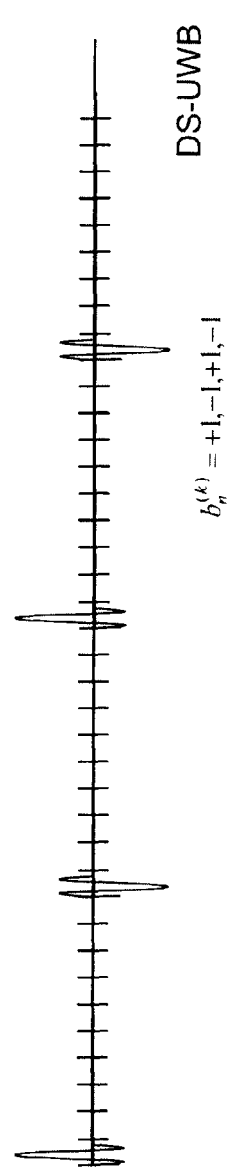
FIG. 2B DS-UWB
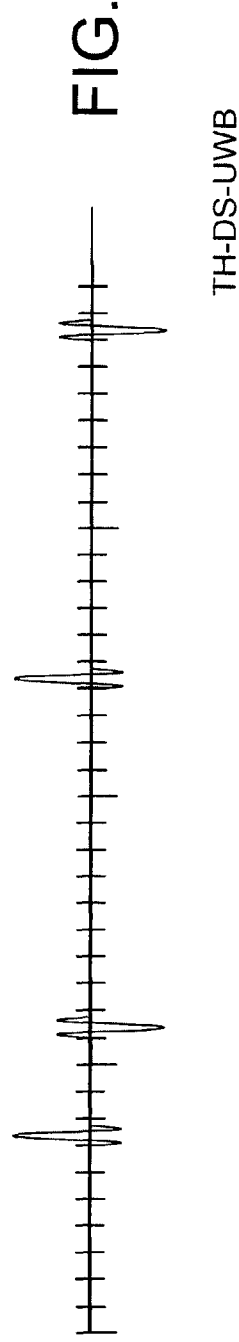
FIG. 2C TH-DS-UWB

SPACE-TIME CODING METHOD FOR A MULTI-ANTENNA SYSTEM OF THE UWB PULSE TYPE

TECHNICAL FIELD

The present invention relates to both the field of ultra large band or UWB (Ultra Wide Band) telecommunications and that of multi-antenna space-time coding STC (Space Time Coding) systems.

STATE OF THE PRIOR ART

Wireless telecommunications systems of the multi-antenna type are well known from the state of the art. These systems use a plurality of antennas for emission and/or reception and are designated, according to the type of adopted configuration, as MIMO (Multiple Input Multiple Output), MISO (Multiple Input Single Output) or SIMO (Single Input Multiple Output) systems. In the following, we shall use the same term MIMO for covering the MIMO and MISO aforementioned alternatives. Exploitation of spatial diversity upon emission and/or reception allows these systems to provide significantly greater channel capacities than those of conventional mono-antenna (or SISO for Single Input Single Output) systems. This spatial diversity is generally completed by time diversity by means of space-time coding. In such a coding, an information symbol to be transmitted is encoded on several antennas and during several transmission instants. Two large categories of MIMO systems with space-time coding are known: the trellis coding or STTC (Space Time Trellis Coding) systems and block coding or STBC (Space Time Block Coding) systems. In a trellis coding system, the space-time encoder may be considered as a finite state machine providing P transmission symbols to P antennas depending on the current state and on the information symbol to be encoded. Decoding upon reception is achieved by a multidimensional Viterbi algorithm, the complexity of which increases exponentially as a function of the number of states. In a block coding system, a block of information symbols to be transmitted is encoded in a transmission symbol matrix, one dimension of the matrix corresponding to the number of antennas and the other one corresponding to the consecutive instants of transmission.

FIG. 1 schematically illustrates a MIMO 100 transmission system with STBC coding. An information symbol block $S=(a_1, \ldots, a_b)$ for example a binary word of b bits or more generally b M-ary symbols is coded in a space-time matrix:

$$C = \begin{pmatrix} c_{1,1} & c_{1,2} & \cdots & c_{1,P} \\ c_{2,1} & c_{2,2} & \cdots & c_{2,P} \\ \vdots & \vdots & \ddots & \vdots \\ c_{T,1} & c_{T,2} & \cdots & c_{T,P} \end{pmatrix} \quad (1)$$

wherein the coefficients $c_{t,p}$, $t=1,\ldots,T$; $p=1,\ldots,P$ of the code are generally complex coefficients depending on the information symbols, P is the number of antennas used for emission, T is an integer indicating the time extension of the code, i.e. the number of instants of use of the channel or PCUs (Per Channel Use).

The function $f$ which provides a correspondence between any vector S of information symbols and the space-time code word C is called a coding function. If the function $f$ is linear it is said that the space-time code is linear. If the coefficients $c_{t,p}$ are real the space-time code is said to be real.

In FIG. 1, a space-time coder is denoted as 110. At each instant t of use of the channel, the encoder provides the multiplexer 120 with the t-th row vector of the matrix C. The multiplexer transmits the coefficients of the row vector to the modulators $130_1, \ldots, 130_P$ and the modulated signals are transmitted by the antennas $140_1, \ldots, 140_P$.

The space-time code is characterized by its throughput rate, i.e. by the number of information symbols that it transmits per instant of channel use (PCU). The code is said to be full rate if it is P times higher than the relative throughput rate for single antenna use (SISO).

The space-time code is further characterized by its diversity which may be defined as the rank of the matrix C. There will be maximum diversity if the matrix $C_1-C_2$ is full rank for any two arbitrary code words $C_1$ and $C_2$ corresponding to two vectors $S_1$ and $S_2$.

Finally, the space-time code is characterized by its coding gain which expresses the minimum distance between different code words. It may be defined as:

$$\min_{C_1 \neq C_2} \det((C_1 - C_2)^H (C_1 - C_2)) \quad (2)$$

or, equivalently, for a linear code:

$$\min_{C \neq 0} \det(C^H C) \quad (3)$$

wherein det(C) refers to the determinant of C and $C^H$ is the conjugate transpose matrix of C. The coding gain for a given transmission energy per information symbol, is limited.

Generally, the coding gain is not fixed but decreases with the order of information modulation, the order on which spectral efficiency depends. In certain cases, when the spectral efficiency increases, the coding gain does not tend to zero but towards an asymptotic non-zero value. Such a code is said to be with a non-vanishing determinant.

Finally, it is made sure that the average energy transmitted by the system is uniformly distributed between antennas and transmission instants.

A perfect code is called full rate code, with maximum diversity, with a non-vanishing determinant and with distributed energy in the sense above.

An example of such a space-time coding for a MIMO two antenna transmission system has been proposed in the article of J-C Belfiore et al. entitled <<The Golden code: a 2×2 full-rate space-time code with non-vanishing determinants>> published in IEEE Transactions on Information Theory, Vol. 51, No. 4, pages 1432-1436, April 2005.

The proposed code, a so-called golden code, is based on a dual algebraic extension K of the field of rational numbers Q: $K=Q(i,\theta)$ wherein $i=\sqrt{-1}$ is a root of the polynomial $X^2+1$ and $\theta$ is the golden number $$\theta = \frac{1+\sqrt{5}}{2},$$

a root of the polynomial $X^2-X-1$. The golden code may be represented by the following matrix:

$$C_{gold} = \begin{pmatrix} \alpha(a_1 + \theta a_2) & \alpha(a_3 + \theta a_4) \\ i\alpha_1(a_3 + \theta_1 a_4) & \alpha_1(a_1 + \theta_1 a_2) \end{pmatrix} \quad (4)$$

wherein $S=(a_1,a_2,a_3,a_4)$ is an information symbol vector. $a_1,a_2,a_3,a_4$ are complex symbols of a constellation $2^b$-QAM, a subset of $Z[i]$ wherein $Z$ is the ring of integers.

$$\theta_1 = \frac{1+\sqrt{5}}{2}$$

is the conjugate root of $\theta$, $\alpha=1+i(1-\theta)$ and $\alpha_1=1+i(1-\theta_1)$.

Examples of perfect space-time codes for a MIMO system with 2, 3, 4 or 6 transmission antennas will be found in the article of Frédérique Oggier et al. entitled <<Perfect space time block codes>> submitted to publication in the IEEE Transactions on Information Theory and available at the www.comelec.enst.fr/~belfiore site.

Another field of telecommunications is presently the object of considerable research. This deals with UWB telecommunications systems, notably recommended for the development of future wireless personal area networks (WPAN). These systems have the specificity of directly working in a base band with very wide band signals. By UWB signal is generally meant a signal complying with a spectral mask stipulated in the FCC regulation as of Feb. 14, 2002 and reviewed in March 2005, i.e. essentially a signal in the spectral band from 3.1 to 10.6 GHz and having a −10 dB bandwidth of at least 500 MHz. In practice, two types of UWB signals are known, the multi-band OFDM (MB-OFDM) signals and the UWB signals of the pulse type. In the following, we are only interested in the latter.

A UWB pulse signal consists of very short pulses, typically of the order of a few hundred picoseconds, distributed within a frame. In order to reduce multiple access interference (MAI for Multiple Access Interference), a distinct time hopping code (TH for Time Hopping) is assigned to each user. The signal from or sent to a user k may then be written as follows:

$$s_k(t) = \sum_{n=0}^{N_s-1} w(t - nT_s - c_k(n)T_c) \quad (5)$$

wherein w is the elementary pulse shape, $T_c$ is chip duration, $T_s$ is the duration of an elementary interval with $N_s=N_cT_c$ wherein $N_c$ is the number of chips in an interval, the total frame being of duration $T_f=N_sT_s$ wherein N, is the number of intervals in the frame. The elementary pulse duration is selected to be less than the chip duration, i.e. $T_w \leq T_c$. The sequence $c_k(n)$ for $n=0, \ldots, N_s-1$ defines the time hopping code of the user k. Time hopping sequences are selected so as to minimize the number of collisions between pulses belonging to time hopping sequences of different users.

FIG. 2A shows a TH-UWB signal associated with a user k. In order to transmit a given information symbol from or to a user k, the TH-UWB signal is generally modulated with a position modulation (PPM for Pulse Position Modulation), i.e. for the modulated signal:

$$s_k(t) = \sum_{n=0}^{N_s-1} w(t - nT_s - c_k(n)T_c - d_k\varepsilon) \quad (6)$$

wherein $\varepsilon$ is a modulation dither substantially less than the chip duration $T_c$ and $d_k \in \{0, \ldots, M-1\}$ is the M-ary PPM position of the symbol.

Alternatively, the information symbols may be transmitted by means of amplitude modulation (PAM). In this case, the modulated signal may be written as:

$$s_k(t) = \sum_{n=0}^{N_s-1} a^{(k)} \cdot w(t - nT_s - c_k(n)T_c) \quad (7)$$

where $a^{(k)}=2m'-1-M'$ with $m'=1, \ldots, M'$, is the M'-ary symbol of the PAM modulation. For example, a BPSK modulation (M'=2) may be used.

The PPM and PAM modulations may be combined into a single M.M'-ary composite modulation, conventionally designated as M-PPM-M'-PAM. Le modulated signal then has the general following form:

$$s_k(t) = \sum_{n=0}^{N_s-1} \sum_{m=0}^{M-1} a_m^{(k)} \cdot w(t - nT_s - c_k(n)T_c - m\varepsilon) \quad (8)$$

The alphabet of this cardinal M.M' modulation was illustrated in FIG. 3. For each of the M positions, M' modulation amplitudes are possible. A symbol (d,a) of the alphabet may be represented by a sequence $a_m$, $m=0, \ldots, M-1$ with $a_m=\delta(m-d)a$ wherein d is a position of the PPM population, a is a PAM modulation amplitude and $\delta(\cdot)$ is the Dirac distribution.

Instead of separating the different users by means of time hopping codes, it is also possible to separate them by orthogonal codes, for example Hadamard codes, such as in DS-CDMA. This is then termed DS-UWB (Direct Spread UWB). In this case, the expression of the non-modulated signal corresponding to (5) is:

$$s_k(t) = \sum_{n=0}^{N_s-1} b_n^{(k)} w(t - nT_s) \quad (9)$$

wherein $b_n^{(k)}$, $n=0, \ldots, N_s-1$ is the spread sequence of user k. It is noted that the expression (9) is similar to that of a conventional DS-CDMA signal. However, it differs therefrom by the fact that the chips do not occupy the whole frame but are distributed to the period $T_s$. A DS-UWB signal associated with a user k is illustrated in FIG. 2B.

As earlier, the information symbols may be transmitted by means of a PPM modulation, a PAM modulation or a composite M-PPM-M'-PAM modulation. The amplitude-modulated DS-UWB signal corresponding to the TH-UWB signal (7) may be expressed as, while retaining the same notations:

$$s_k(t) = \sum_{n=0}^{N_s-1} a^{(k)} b_n^{(k)} \cdot w(t - nT_s) \quad (10)$$

Finally, it is known how to combine time hopping codes and spectral spread codes in order to provide multiple accesses to different users. A TH-DS-UWB pulse UWB signal is thereby obtained with the general form:

$$s_k(t) = \sum_{n=0}^{N_s-1} b_n^{(k)} \cdot w(t - nT_s - c_k(n)T_c) \quad (11)$$

A TH-DS-UWB signal associated with a user k is illustrated in FIG. 2C. This signal may be modulated by an M-PPM-M'PAM composite modulation. One then obtains for the modulation signal:

$$s_k(t) = \sum_{n=0}^{N_s-1} \sum_{m=0}^{M-1} a_m^{(k)} b_n^{(k)} \cdot w(t - nT_s - c_k(n)T_c - m\varepsilon) \quad (12)$$

The use of UWB signals in MIMO systems is known from the state of the art. In this case, each antenna transmits an UWB signal, modulated as a function of an information symbol or of a block of such symbols (STBC).

Space-time coding techniques initially developed for narrow band signals or for DS-CDMA are poorly applied to UWB pulse signals. Indeed, known space-time codes, such as the golden code, are generally complex coefficients, and therefore convey phase information. Now, it is excessively difficult to recover this phase information in a signal with a band as wide as that of UWB pulse signals. The very narrow time support of the pulses lends itself to position modulation (PPM) or amplitude modulation (PAM) much better.

A space-time coding of UWB signals was proposed in the article of Chadi Abou-Rjeily et al. entitled <<Space-Time coding for multiuser Ultra-Wideband communications>> submitted for publication in the IEEE Transactions on Communications, September 2005 and available at www.tsi.enst.fr.

According to the constraints posed above, the proposed space-time code is real. For example for a configuration with two emission antennas, the code may be written as:

$$C = \begin{pmatrix} \beta(a_1 + \theta a_2) & \sqrt{2}\beta(a_3 + \theta a_4) \\ \sqrt{2}\beta_1(a_3 + \theta_1 a_4) & \beta_1(a_1 + \theta_1 a_2) \end{pmatrix} \quad (13)$$

with $$\beta = \frac{1}{\sqrt{1+\theta^2}} \text{ and } \beta_1 = \frac{1}{\sqrt{1+\theta_1^2}};$$

$S=(a_1,a_2,a_3,a_4)$ is a vector of PAM information symbols, i.e. $a_i \in \{-M'+1, \ldots, M'-1\}$.

In this same article, it is suggested that this space-time code be generalized to the coding of a block of information symbols belonging to a PPM-PAM alphabet. For a configuration with two emission antennas, this code may be expressed by the matrix of size 2M×2:

$$C = \begin{pmatrix} \beta(a_{1,0} + \theta a_{2,0}) & \sqrt{2}\beta(a_{3,0} + \theta a_{4,0}) \\ \vdots & \vdots \\ \beta(a_{1,M-1} + \theta a_{2,M-1}) & \sqrt{2}\beta(a_{3,M-1} + \theta a_{4,M-1}) \\ \sqrt{2}\beta_1(a_{3,0} + \theta_1 a_{4,0}) & \beta_1(a_{1,0} + \theta_1 a_{2,0}) \\ \vdots & \vdots \\ \sqrt{2}\beta_1(a_{3,M-1} + \theta_1 a_{4,M-1}) & \beta_1(a_{1,M-1} + \theta_1 a_{2,M-1}) \end{pmatrix} \quad (14)$$

Each information symbol $a_i=(a_{i,0}, \ldots, a_{i,M-1})$ is here a vector representing an element of the M-PPM-M'-PAM alphabet with $a_{i,m}=a_i\delta(m-d_i)$ wherein $a_i$ is an element of the M-PAM and $d_i$ of the M'-PPM alphabet. The block of information symbols coded by the code C is none other than $S=(a_1,a_2,a_3,a_4)$.

More specifically, the block of information symbols S gives rise to the generation of UWB signals according to the expressions given hereafter. A monouser usage is assumed in order to simplify notations (no indexation by k, nor spread sequence).

Antenna 1 transmits during the duration of the first frame $T_f$ the signal:

$$s^1(t) = \beta \sum_{n=0}^{N_s-1} \sum_{m=0}^{M-1} (a_{1,m} + \theta a_{2,m}) w(t - nT_s - c(n)T_c - m\varepsilon) \quad (15)$$

a signal which corresponds to the first column vector of the first M lines of the code (14).

Antenna 2 simultaneously transmits during the duration of the first frame $T_f$ the signal:

$$s^2(t) = \beta\sqrt{2} \sum_{n=0}^{N_s-1} \sum_{m=0}^{M-1} (a_{3,m} + \theta a_{4,m}) w(t - nT_s - c(n)T_c - m\varepsilon) \quad (16)$$

a signal which corresponds to the second column vector of the first M lines of the code.

Antenna 1 then transmits during the duration of the second frame, again taking the origin of times as the beginning of the frame:

$$s^1(t) = \beta_1\sqrt{2} \sum_{n=0}^{N_s-1} \sum_{m=0}^{M-1} (a_{3,m} + \theta a_{4,m}) w(t - nT_s - c(n)T_c - m\varepsilon) \quad (17)$$

a signal which corresponds to the first column vector of the last M lines of the code.

Finally antenna 2 simultaneously transmits during the duration of the second frame, the signal:

$$s^2(t) = \beta_1\sqrt{2} \sum_{n=0}^{N_s-1} \sum_{m=0}^{M-1} (a_{1,m} + \theta a_{2,m}) w(t - nT_s - c(n)T_c - m\varepsilon) \quad (18)$$

a signal which corresponds to the second column vector of the last M lines of the code.

The space-time code as defined above has very good performances in terms of diversity. However, its coding gain is less than that of the golden code as defined by (4). Further, the scalar term $\sqrt{2}$ appearing in the matrix (14) creates at each frame energy unbalance among the antennas.

An object of the present invention is to propose a real space-time code for a MIMO system with UWB pulse signals which has a coding gain above that of the aforementioned real space-time code. Another object of the present invention is to provide a real space-time code which may be applied to a MIMO system with any number of antennas. Finally, another object of the present invention is to propose a space-time code having at each frame a uniform distribution of energy over the different antennas.

DISCUSSION OF THE INVENTION

The present invention is defined by a space-time coding method for a UWB transmission system comprising at least two radiative elements, said method encoding a block of information symbols ($S=(a_1, a_2 \ldots, a_{p^2})$) belonging to an M-PPM modulation or M-PPM-M'-PAM composite modulation alphabet with M being even, into a sequence of vectors ($s^{i,j}, \Omega s^{i,j}$), the components of a vector being intended to modulate a UWB pulse signal for a radiative element of said system and for a given transmission interval ($T_f$). Said vectors are defined as the elements of the matrix:

$$C = \begin{pmatrix} s^{1,1} & s^{2,1} & s^{3,1} & \ldots & s^{P,1} \\ \Omega s^{P,2} & s^{1,2} & s^{2,2} & \ldots & s^{P-1,2} \\ \vdots & \Omega s^{P,3} & s^{1,3} & \ddots & \vdots \\ \Omega s^{3,P-1} & \ddots & \ddots & \ddots & s^{2,P-1} \\ \Omega s^{2,P} & \Omega s^{3,P} & \ldots & \Omega s^{P,P} & s^{1,P} \end{pmatrix}$$

defined to within one permutation of its lines and/or its columns, one line corresponding to a transmission interval and one column to a radiative element, wherein P is the number of radiative elements and $\Omega$ is a matrix of size M×M defined by $$\Omega = \begin{pmatrix} \omega & O_{2\times 2} & \ldots & O_{2\times 2} \\ O_{2\times 2} & \omega & \ldots & O_{2\times 2} \\ \vdots & \vdots & \ddots & \vdots \\ O_{2\times 2} & \ldots & O_{2\times 2} & \omega \end{pmatrix}$$

wherein $$\omega = \begin{pmatrix} \cos\theta & \sin\theta \\ -\sin\theta & \cos\theta \end{pmatrix} \text{ and } O_{2\times 2}$$

is the zero matrix of size 2×2, $$s^{i,j} = (R_j \otimes I_M) \begin{pmatrix} a_{(i-1)P+1} \\ a_{(i-1)P+P} \\ \vdots \\ a_{iP} \end{pmatrix}$$

to within a ±10% margin, where $I_M$ is the identity matrix of size M×M, $\otimes$ is the tensor product, $a_\ell$, $\ell=1, \ldots, P^2$ are the information symbols, $R_j$ is a line vector of dimension P corresponding to the $j^{th}$ line of an orthogonal matrix R generating the lattice of points $\Lambda=\{u\Theta | u\in Z^P\}$ with $$\Theta = \begin{pmatrix} 1 & \theta_0 & \ldots & \theta_0^{P-1} \\ 1 & \theta_1 & \ldots & \theta_1^{P-1} \\ \vdots & \vdots & \ldots & \vdots \\ 1 & \theta_{P-1} & \ldots & \theta_{P-1}^{P-1} \end{pmatrix} \text{ wherein } \theta_p = 2\cos\left(\frac{2(p+1)\pi}{N}\right)$$

wherein N is a positive integer such that $\phi(N)=2P$ wherein $\phi(\bullet)$ is the Euler indicator and $$\theta = \frac{2\pi}{N'}$$

wherein N' is a positive integer such that $\phi(N')\geq P$ and N, N' are prime together.

According to an alternative, the orthogonal matrix is expressed as $R=\Theta V$ wherein V is a matrix, the columns of which are formed by vectors $v^{(p)}=(v_0^{(p)}, v_1^{(p)}, \ldots, v_{P-1}^{(p)})^T$ p=0, ..., P−1, the coefficients of which are rational.

The invention also relates to a method for transmitting a plurality of information symbols belonging to an M-PPM modulation or M-PPM-M'-PAM composite modulation alphabet with M being even. Said information symbols are coded by means of the space-time coding defined above in order to provide $p^2$ vectors of dimension M, elements of said matrix C, the components of each of these vectors modulating the position or else the position and amplitude of the pulses making up a UWB pulse signal, in order to obtain $p^2$ corresponding modulated UWB pulse signals, the signals being respectively transmitted by the P radiative elements during P transmission intervals.

The radiative elements may be UWB antennas, laser diodes or light-emitting diodes.

The pulse signal will advantageously be a TH-UWB signal, a DS-UWB signal or further a TH-DS-UWB signal.

SHORT DESCRIPTION OF THE DRAWINGS

Other features and advantages of the invention will become apparent upon reading through a preferential embodiment of the invention made with reference to the appended figures wherein:

FIG. 1 schematically illustrates a MIMO transmission system with STBC coding as known from the state of the art;

FIGS. 2A-2C illustrate respective shapes of TH-UWB, DS-UWB and TH-DS-UWB signals;

Figure 1:
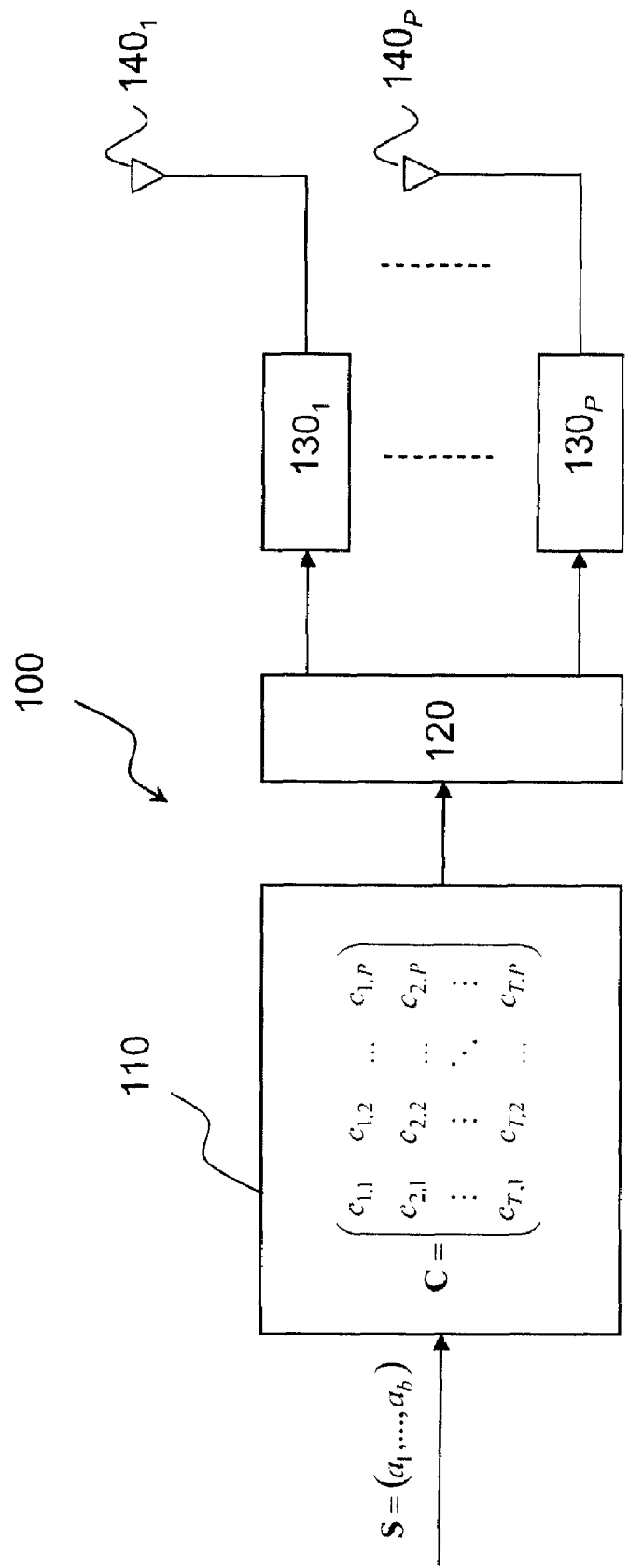
Figure 3:
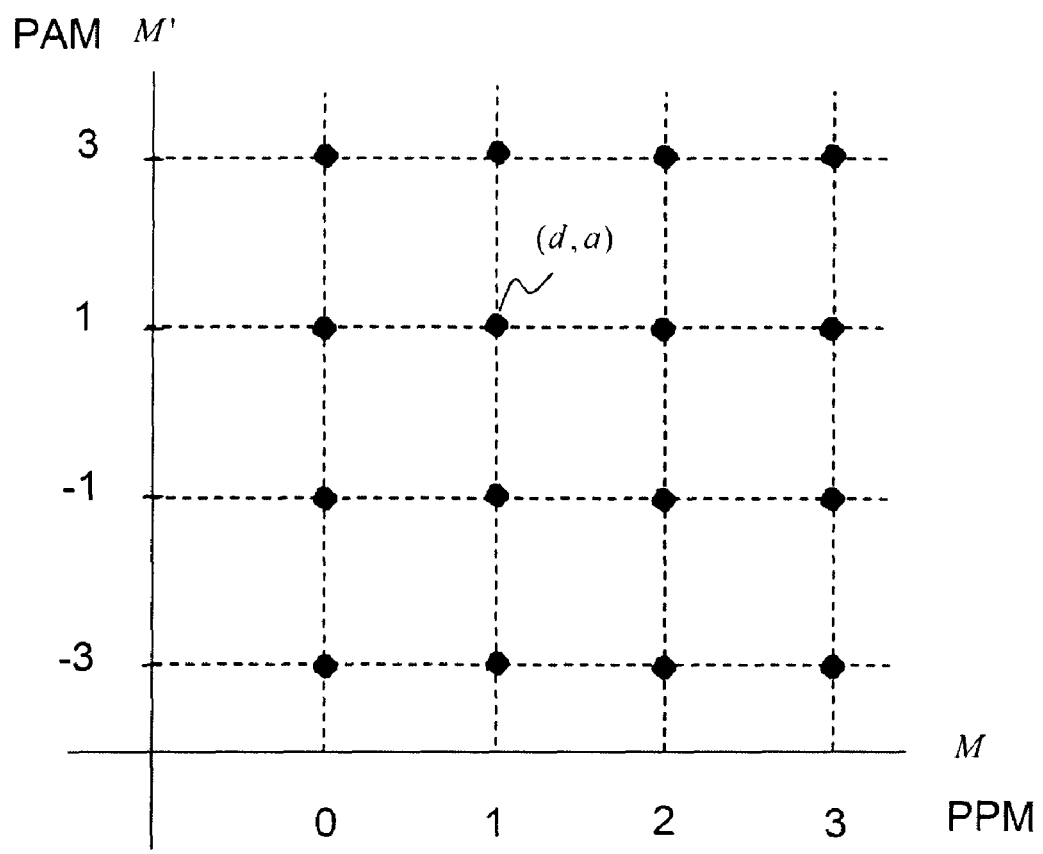
FIG. 3 illustrates an exemplary constellation of a PPM-PAM modulation.
Figure 4:
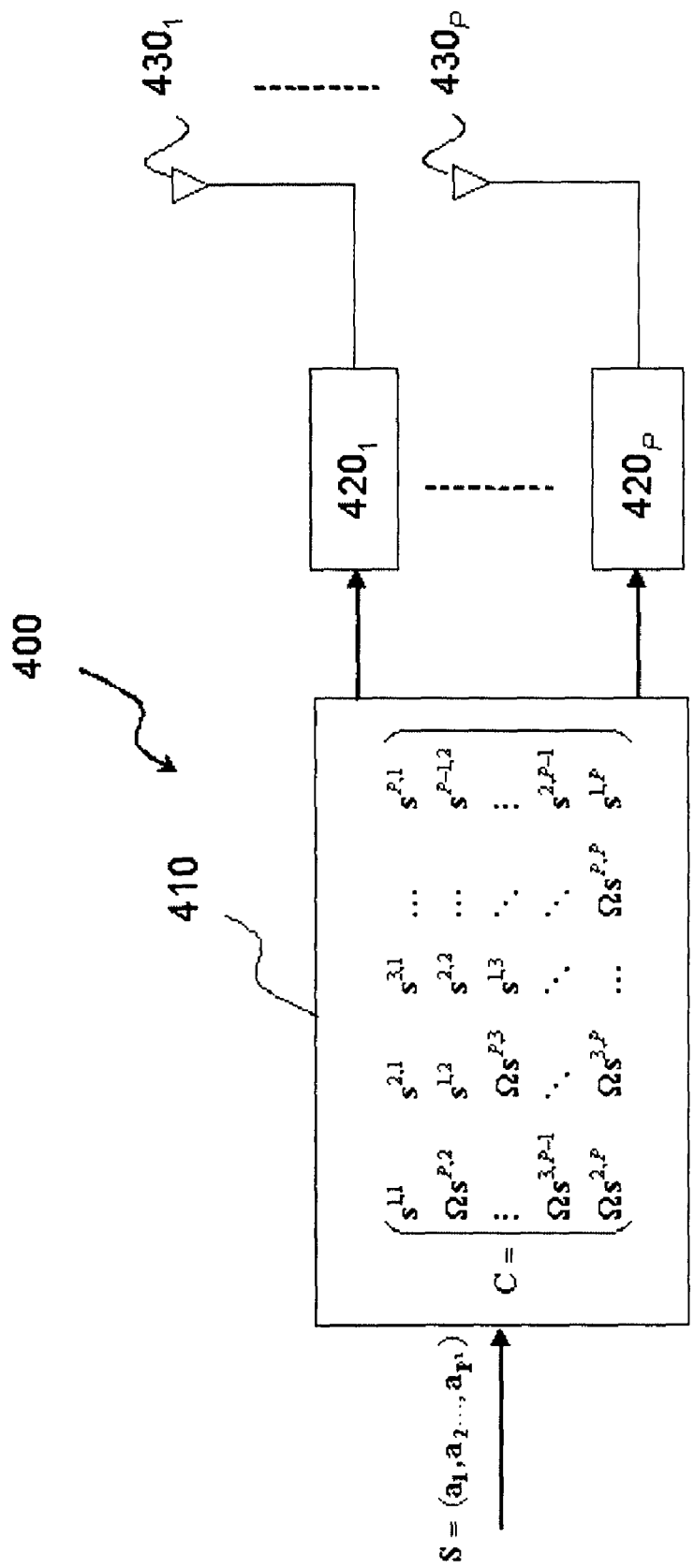

FIG. 4 schematically illustrates a MIMO transmission system using the space-time coding according to the invention.

DETAILED DISCUSSION OF PARTICULAR EMBODIMENTS

The idea on which the invention is based, is to create a space-time code which gets rid of both complex values $\alpha$ and $\alpha_1$ appearing in the golden code (4), incompatible as this was stated with the use of UWB pulse signals, and of scalars $\sqrt{2}$ appearing in the codes (13) and (14), at the origin of an unbalanced distribution of energy on the antennas.

The proposed space-time code is applied to MIMO systems with any number P of transmission antennas using UWB pulse signals in which the information symbols are elements of an M-PPM-M'-PAM modulation or of an M-PPM modulation, with M being even.

The proposed code is represented by the matrix of size MP×P:

$$C = \begin{pmatrix} s^{1,1} & s^{2,1} & s^{3,1} & \ldots & s^{P,1} \\ \Omega s^{P,2} & s^{1,2} & s^{2,2} & \ldots & s^{P-1,2} \\ \vdots & \Omega s^{P,3} & s^{1,3} & \ddots & \vdots \\ \Omega s^{3,P-1} & \ddots & \ddots & \ddots & s^{2,P-1} \\ \Omega s^{2,P} & \Omega s^{3,P} & \ldots & \Omega s^{P,P} & s^{1,P} \end{pmatrix} \quad (19)$$

wherein the terms $s^{i,j}$, $i=1, \ldots, P$, $j=1, \ldots, P$ are vectors of dimension M, the components of which will be specified later on and $\Omega$ is a matrix of size M×M defined by:

$$\Omega = \begin{pmatrix} \omega & O_{2\times 2} & \ldots & O_{2\times 2} \\ O_{2\times 2} & \omega & \ldots & O_{2\times 2} \\ \vdots & \vdots & \ddots & \vdots \\ O_{2\times 2} & \ldots & O_{2\times 2} & \omega \end{pmatrix} \quad (20)$$

wherein the matrix $O_{2\times 2}$ is the matrix of size 2×2, for which all the elements are zero and $\omega$ is a matrix of a rotation by an angle $\theta$ which will be specified subsequently, i.e.:

$$\omega = \begin{pmatrix} \cos\theta & -\sin\theta \\ \sin\theta & \cos\theta \end{pmatrix} \quad (20')$$

From (20), the matrix $\Omega$ obtained by M/2 fold replication of the elementary matrix $\omega$ on the diagonal, the other elements being zero.

The vectors $s^{i,j}$ are obtained in the following way:

$$s^{i,j} = (R_j \otimes I_M) \begin{pmatrix} a_{(i-1)P+1} \\ a_{(i-1)P+P} \\ \vdots \\ a_{iP} \end{pmatrix} \quad (21)$$

wherein $I_M$ is the identity matrix of size M×M, $\otimes$ is the tensor (or Kronecker) product and the terms $a_l$, $l=1, \ldots, P^2$ are vectors of dimension M representing the $P^2$ information symbols to be coded. It is recalled that these symbols are elements of an M-PPM-M'-PAM or M-PPM modulation constellation, i.e. $a_l = (a_0 l \; a l \; \ldots \; a_{M-1} l)^T$ wherein the coefficients of this vector are elements of an M'-PAM modulation alphabet in the first case, and equal to 1 in the second case. The corresponding line vector $R_j$ of size 1×P corresponds to the $j^{th}$ line of the following matrix R:

$$R = \begin{pmatrix} \sum_{p=0}^{P-1} v_p^{(0)} \theta_0^p & \sum_{p=0}^{P-1} v_p^{(1)} \theta_0^p & \ldots & \sum_{p=0}^{P-1} v_p^{(P-1)} \theta_0^p \\ \sum_{p=0}^{P-1} v_p^{(0)} \theta_1^p & \sum_{p=0}^{P-1} v_p^{(1)} \theta_1^p & \ldots & \sum_{p=0}^{P-1} v_p^{(P-1)} \theta_1^p \\ \vdots & \vdots & \vdots & \vdots \\ \sum_{p=0}^{P-1} v_p^{(0)} \theta_{P-1}^p & \sum_{p=0}^{P-1} v_p^{(1)} \theta_{P-1}^p & \ldots & \sum_{p=0}^{P-1} v_p^{(P-1)} \theta_{P-1}^p \end{pmatrix} \quad (22)$$

wherein the terms $v_p^{(q)}$ for $p=0, \ldots, P-1$ and $q=0, \ldots, P-1$ are rational numbers and the values $\theta_p$, $p=0, \ldots, P-1$ are defined by:

$$\theta_p = 2\cos\left(\frac{2(p+1)\pi}{N}\right) \quad (23)$$

wherein N is a positive integer selected so that $\phi(N)=2P$ wherein $\phi(\bullet)$ is the Euler indicator, giving for each integer N the number of positive integers less than or equal to N and prime with the latter.

The angle $\theta$ in the expression (20') is selected so that $$\theta = \frac{2\pi}{N'}$$

with $\phi(N') \geq P$ and N, N' are prime together.

The matrix R is selected to be orthogonal, i.e. $RR^T = I_P$ wherein $I_P$ is the unit matrix of size P×P.

It is noted that $R=\Theta V$ wherein $\Theta$ is the Vandermonde matrix:

$$\Theta = \begin{pmatrix} 1 & \theta_0 & \ldots & \theta_0^{P-1} \\ 1 & \theta_1 & \ldots & \theta_1^{P-1} \\ \vdots & \vdots & \ldots & \vdots \\ 1 & \theta_{P-1} & \ldots & \theta_{P-1}^{P-1} \end{pmatrix} \quad (24)$$

and V is the matrix, the columns of which consist of the vectors $v^{(p)} = (v_0^{(p)}, v_1^{(p)}, \ldots, v_{P-1}^{(p)})^T$.

If the lattice of points $\Lambda = \mathcal{L}(\Theta)$ of dimension P generated by the base consisting of the column vectors of $\Theta$, i.e.: $\Lambda = \{u\Theta | u \in Z^P\}$, is considered, the determination of the matrix R amounts to searching for an orthogonal base of $\Lambda$. The latter may be obtained for example by means of the Lenstra-Lovász-Lenstra algorithm, also called LLL, a description of which will be found in the article of A. K. Lenstra et al. entitled <<Factoring polynomials with rational coefficients>> published in 1982 in Math. Ann. Vol. 261, pages 515-534. Examples of rotation matrices R will be found in the article of E. Bayer-Fluckiger et al. entitled <<New algebraic constructions of rotated $Z^n$-lattice constellations for the Rayleigh fading channel>> published in the IEEE Transactions on Information Theory, Vol. 50, No. 4, 2004, pages 702-714.

As this may be seen from the expression (22), the matrix R is real and therefore the space-time code matrix C defined in (19) is also real. Also, given the orthogonal nature of matrix R, the distribution of energy of the space-time code over the different antennas is uniform. Additionally, the space-time code C enables $p^2$ information symbols to be coded while using P antennas and P channel usages (PCU). It is therefore performed with a maximum throughput rate.

It may be shown that the code is with maximum diversity $\forall P > 2$.

Finally, it may also be shown that it has a gain larger than that of the real space-time code known from the state of the art.

It is important to note that a permutation of the lines and/or columns of matrix C does not affect the properties of the space-time code. Indeed, a permutation of columns amounts to a simple permutation of the antennas and a line permutation (here a line is understood as a line of vectors of dimension M) amounts to a simple permutation of the instants of use of the channel.

In practice, the elements of matrix C are quantified as digital elements. However, one was able to see that an error of quantification of less than 10% by excess or default did not substantially affect the performances of the code.

FIG. 4 illustrates an exemplary transmission system using the space-time code according to the invention.

The system 400 receives information symbols by a block $S=(a_1, a_2 \ldots, a_{P^2})$ wherein the symbols $a_\ell$, $\ell=1, \ldots, P^2$ are vectors of dimension M illustrating elements of an M-PPM or M-PPM-M'-PAM modulation constellation. Alternatively, the information symbols may stem from an M.M'-ary constellation provided that they are subject beforehand to a transcoding (mapping) in an M-PPM-M'-PAM constellation. Of course, the information symbols may stem from one or more operations well-known to one skilled in the art such as source coding, channel coding of the convolutional type, per block or else even series or parallel turbocoding, interlacing, etc.

The block of information symbol is subject to coding operation in the space-time encoder 410. More specifically, the module 410 calculates the terms of the matrix C according (19) of one of the aforementioned precited alternatives.

The P column vectors forming the first line C are first respectively transmitted to the UWB modulators $420_1, \ldots, 420_P$, for the first frame, and then the column P column vectors forming the second line, for the second frame and so forth until transmission of the P column vectors of the last line C, for the $P^{th}$ frame.

Each column vector has M components corresponding to the M positions of PPM modulation. The UWB modulators $420_1, \ldots, 420_P$ generate from the column vectors they receive, corresponding modulated UWB pulse signals. Generally, the UWB pulse signals being used as a support for the modulation may be of the TH-UWB, DS-UWB or TH-DS-UWB type. For example, for a UWB modulator $420_p$, of the TH-UWB type, associated with the $p^{th}$ column of the matrix, the modulated UWB pulse signal for the first transmission interval will be (cf. equation 8):

$$s^p(t) = \sum_{n=0}^{N_s-1} \sum_{m=0}^{M-1} s_m^{p,1} \cdot w(t - nT_s - c_k(n)T_c - m\varepsilon) \quad (25)$$

wherein the values $s_m^{p,1}$ are the PAM components of the vector $s^{p,1}$.

The UWB pulse signals thus modulated are then transmitted to the radiated elements $430_1$ to $430_P$. These radiated elements may be UWB antennas or laser diodes or LEDs for example operating in the infrared domain, associated with electro-optical modulators. The proposed transmission system then be used in the field of wireless optical telecommunications.

The UWB signals transmitted by the system illustrated in FIG. 4 may be processed by a multi-antenna receiver in a standard way. The receiver may for example comprise a Rake type correlation stage followed by a decision stage, for example using a sphere decoder known to one skilled in the art.

The invention claimed is:

1. A space-time coding method for a UWB transmission system comprising at least two radiative elements, said method comprising:

coding a block of information symbols $(S=(a_1, a_2, \ldots, a_{P^2}))$ belonging to an M-PPM modulation or M-PPM-M'-PAM composite modulation alphabet with M being even, into a sequence of vectors $(s^{i,j}, \Omega s^{i,j})$, the components of a vector being intended to modulate a UWB pulse signal for a radiative element of said system and for a given transmission interval $(T_f)$, wherein said vectors are defined as the elements of the matrix:

$$C = \begin{pmatrix} s^{1,1} & s^{2,1} & s^{3,1} & \ldots & s^{P,1} \\ \Omega s^{P,2} & s^{1,2} & s^{2,2} & \ldots & s^{P-1,2} \\ \vdots & \Omega s^{P,3} & s^{1,3} & \ddots & \vdots \\ \Omega s^{3,P-1} & \ddots & \ddots & \ddots & s^{2,P-1} \\ \Omega s^{2,P} & \Omega s^{3,P} & \ldots & \Omega s^{P,P} & s^{1,P} \end{pmatrix}$$

defined to within one permutation of its lines and/or its columns, a line corresponding to a transmission interval and a column to a radiative element, wherein P is the number of radiative elements and $\Omega$ is a matrix of size M×M defined by $$\Omega = \begin{pmatrix} \omega & O_{2\times 2} & \ldots & O_{2\times 2} \\ O_{2\times 2} & \omega & \ldots & O_{2\times 2} \\ \vdots & \vdots & \ddots & \vdots \\ O_{2\times 2} & \ldots & O_{2\times 2} & \omega \end{pmatrix}$$

wherein $$\omega = \begin{pmatrix} \cos\theta & \sin\theta \\ -\sin\theta & \cos\theta \end{pmatrix}$$

and $O_{2\times 2}$ is the zero matrix of size 2×2, $$s^{i,j} = (R_j \otimes I_M) \begin{pmatrix} a_{(i-1)P+1} \\ a_{(i-1)P+P} \\ \vdots \\ a_{iP} \end{pmatrix}$$

to within a margin of ±10%, wherein $I_M$ is the identity matrix of size M×M, $\otimes$ is the tensor product, $a_\ell$, $\ell=1, \ldots, P^2$ are the information symbols, $R_j$ is a line vector of dimension P corresponding to the $j^{th}$ line of an orthogonal matrix R generating the lattice points $\Lambda = \{u\Theta | u \in Z^P\}$ with $$\Theta = \begin{pmatrix} 1 & \theta_0 & \ldots & \theta_0^{P-1} \\ 1 & \theta_1 & \ldots & \theta_1^{P-1} \\ \vdots & \vdots & \ldots & \vdots \\ 1 & \theta_{P-1} & \ldots & \theta_{P-1}^{P-1} \end{pmatrix}$$

where $$\theta_p = 2\cos\left(\frac{2(p+1)\pi}{N}\right)$$

wherein N is a positive integer such that $\phi(N)=2P$ wherein $\phi(.)$ is the Euler indicator and $$\theta = \frac{2\pi}{N'}$$

wherein N' is a positive integer such that $\phi(N') \geq P$ and N, N' are prime together.

2. The space-time coding method according to claim 1, wherein the orthogonal matrix is expressed as $R=\theta V$ wherein V is a matrix, the columns of which are formed by vectors $v^{(p)}=(v_1^{(p)}, v_1^{(p)}, \ldots, v_{P-1}^{(p)})^T$ p=0, ..., P−1, the coefficients of which are rational.

3. A method for transmitting a plurality of information symbols belonging to an M-PPM modulation or M-PPM-M'-PAM modulation alphabet with M being even, characterized in that said information symbols are coded by the space-time coding according to claim 1 to provide $P^2$ vectors of dimension M, elements of said matrix C, the components of each of these vectors modulating the position or else the position and amplitude of the pulses making up a UWB pulse signal, in order to obtain $P^2$ corresponding modulated UWB pulse signals, the signals being respectively transmitted by the P radiated elements during P transmission intervals.

4. The transmission method according to claim 3, wherein the radiated elements UWB are antennas.

5. The transmission method according to claim 3, wherein the radiated elements are laser diodes or light-emitting diodes.

6. The method according to claim 3, wherein said pulse signal is a TH-UWB signal.

7. The method according to claim 3, wherein said pulse signal is a DS-UWB signal.

8. The method according to claim 3, wherein said pulse signal is a TH-DS-UWB signal.

* * * * *